US005198003A

United States Patent [19]

Haynes

[11] Patent Number: 5,198,003

[45] Date of Patent: Mar. 30, 1993

[54] SPIRAL WOUND ELECTROSTATIC AIR CLEANER AND METHOD OF ASSEMBLING

[75] Inventor: Charles A. Haynes, Seymour, Tenn.

[73] Assignee: Carrier Corporation, Syracuse, N.Y.

[21] Appl. No.: 724,650

[22] Filed: Jul. 2, 1991

[51] Int. Cl.[5] .......... B03C 3/41; B23P 21/00; B29C 53/56

[52] U.S. Cl. .......... 55/138; 29/869; 29/902; 55/141; 264/259; 264/339; 264/DIG. 48

[58] Field of Search .......... 55/136-138, 55/141, 147, 101, 2; 29/869, 902; 264/259, 339, DIG. 48

[56] References Cited

U.S. PATENT DOCUMENTS

| | | | |
|---|---|---|---|
| 2,794,118 | 5/1957 | Kiriloff et al. | 55/101 X |
| 2,926,749 | 3/1960 | Oswald | 55/141 X |
| 3,558,286 | 1/1971 | Gourdine | 55/138 X |
| 3,788,041 | 1/1974 | Gaylord | 55/138 X |
| 4,313,741 | 2/1982 | Masuda et al. | 55/138 |

*Primary Examiner*—Richard L. Chiesa

[57] ABSTRACT

An electrostatic air cleaner collector and/or ionizer section has their oppositely charged elements being formed of single, continuous, electrically conductive elements, spirally wound around insulator rods to jointly define a spiral passage through which air is caused to flow. The collector and ionizer may be assembled separately by such a winding process, or they may contain common insulator rods around which the conductive element of both sections may be simultaneously wound. A conductive rod may be inserted to electrically interconnect the high voltage elements of the respective ionizer and collector sections.

7 Claims, 5 Drawing Sheets

SPIRAL WOUND ELECTROSTATIC AIR CLEANER AND METHOD OF ASSEMBLING

BACKGROUND OF THE INVENTION

This invention relates generally to electrostatic air cleaning devices and more particularly, to an improved cell structure and method of making same.

A typical electrostatic air cleaner cell includes an ionizer section and a collector section, both of which include discreet high voltage elements interconnected between grounded plates. That is, the ionizer has positive wires and negative strips alternately connected, in parallel relationship, between the grounded plates. The collector section has installed between its grounded plates, alternate high and low voltage plates arranged in parallel relationship. This combination of high and low voltage plates and wires are typically secured and isolated from one another by a variety of insulators, tubes, spacers etc. The finished cells are therefore relatively heavy and expensive, both in materials and in labor of assembly.

One problem that is sometimes experienced with conventional cells is that of "oil canning", wherein an aluminum plate can be caused to flex or "bow out" to one side, thereby reducing the distance from the adjacent, oppositely charged plate. This in turn can cause arcing and damage to the cell.

It is therefore an object of the present invention to provide an improved electrostatic air cleaner cell structure and method of manufacture.

Another object of the present invention is the provision in electrostatic air cleaner for eliminating the occurrence of "oil canning".

Yet another object of the present invention is the provision for simplifying the structure of an electrostatic air cleaner cell.

Still another object of the present invention is the provision for reducing the weight and the cost of manufacture of an electrostatic air cleaner cell.

Yet another object of the present invention is the provision for an electrostatic air cleaner cell which is economical to manufacture and effective and efficient in use.

These objects and other features and advantages become readily apparent upon reference to the following description when taken in conjunction with the appended drawings.

SUMMARY OF THE INVENTION

Briefly, in accordance with one aspect of the invention, the positive and negative (or grounded) plates of the collector are formed of a pair of intermeshed, spiral elements which are radially spaced and insulated from one another such that they jointly define a spiral shaped channel through which the air to be cleaned may flow.

In accordance with another aspect of the invention, the electrostatic air cleaner cell is assembled by winding both the positive and negative elements, in an intermeshed spiral pattern, around a plurality of insulator connector rods which are progressively added as the spiral wraps progress radially outwardly. In this manner, the process of winding the elements can be easily and efficiently accomplished without interference of the rods. Further, the tension in the windings can be maintained so as to prevent the oil canning phenomenon which might otherwise occur.

By yet another aspect of the invention, the collector and ionizer sections can be made simultaneously by using rods that project axially beyond the axial limits of the collector such that the ionizer wires and strips may be spirally wound around the rod extensions in much the same way as the collector elements. Again the pair of spirally wound elements define a spiral passage through which the air may flow to be ionized. In order to electrically interconnect the wires of the ionizer section with the plates of like plurality in the collector, a common conductive rod may be inserted between the ionizer and the collector sections.

In the drawings as hereinafter described, a preferred embodiment is depicted; however, various modifications and alternate constructions can be made thereto without departing from the true spirit and scope of the invention.

DESCRIPTION OF THE PREFERRED EMBODIMENT

Figure 1:
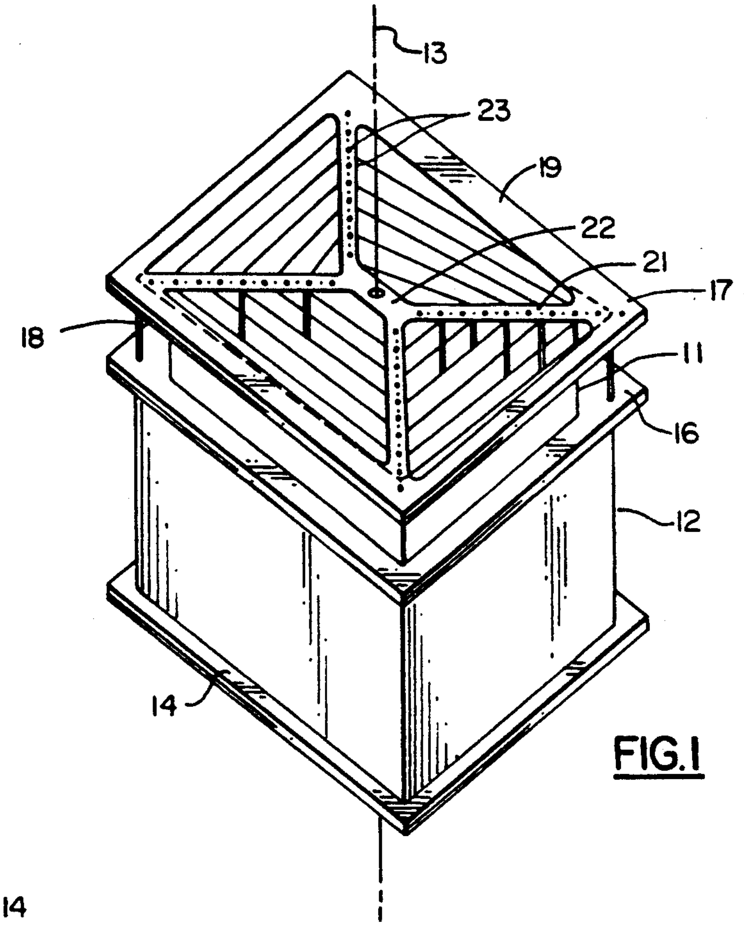
FIG. 1 is a prospective view of an electrostatic air cleaner in accordance with the present invention.

Referring now to FIG. 1, an electrostatic air cleaner cell in accordance with the present invention is shown to include an ionizer section 11, and a collector section 12, with the two being interconnected in serial flow relationship along a central axis 13, along which the flow of air would pass as it flows through the cell to be cleaned.

The framework for the cell includes a bottom plate 14, a middle plate 16, and a top plate 17, each of the individual plates being interconnected by a plurality of insulator connector rods 18 in a manner to be described hereafter.

Each of the plates 14, 16 and 17 has a generally rectangular peripheral framework 19, with generally radially extending ribs 21 leading to a central structural portion 22. The plates are made from a stiff, high density polypropylene or pressed polyester material which demonstrates high electrical insulative properties. The ribs 21 have a plurality of openings 23 formed therein for receiving the rods 18 in a manner to be described below.

It should be mentioned that both the structure and the method of the present invention is applicable to both the collector and the ionizer sections taken individually or in combination. That is, the collector and the ionizer may be assembled separately, with either or both using the concepts of the present invention, with the two then being interconnected to complete the final cell structure. Alternatively, they may be assembled simultaneously as a single unit, with both employing the principals of the present invention. Such a combined structure is shown in FIGS. 1 and 2.

Figure 2:
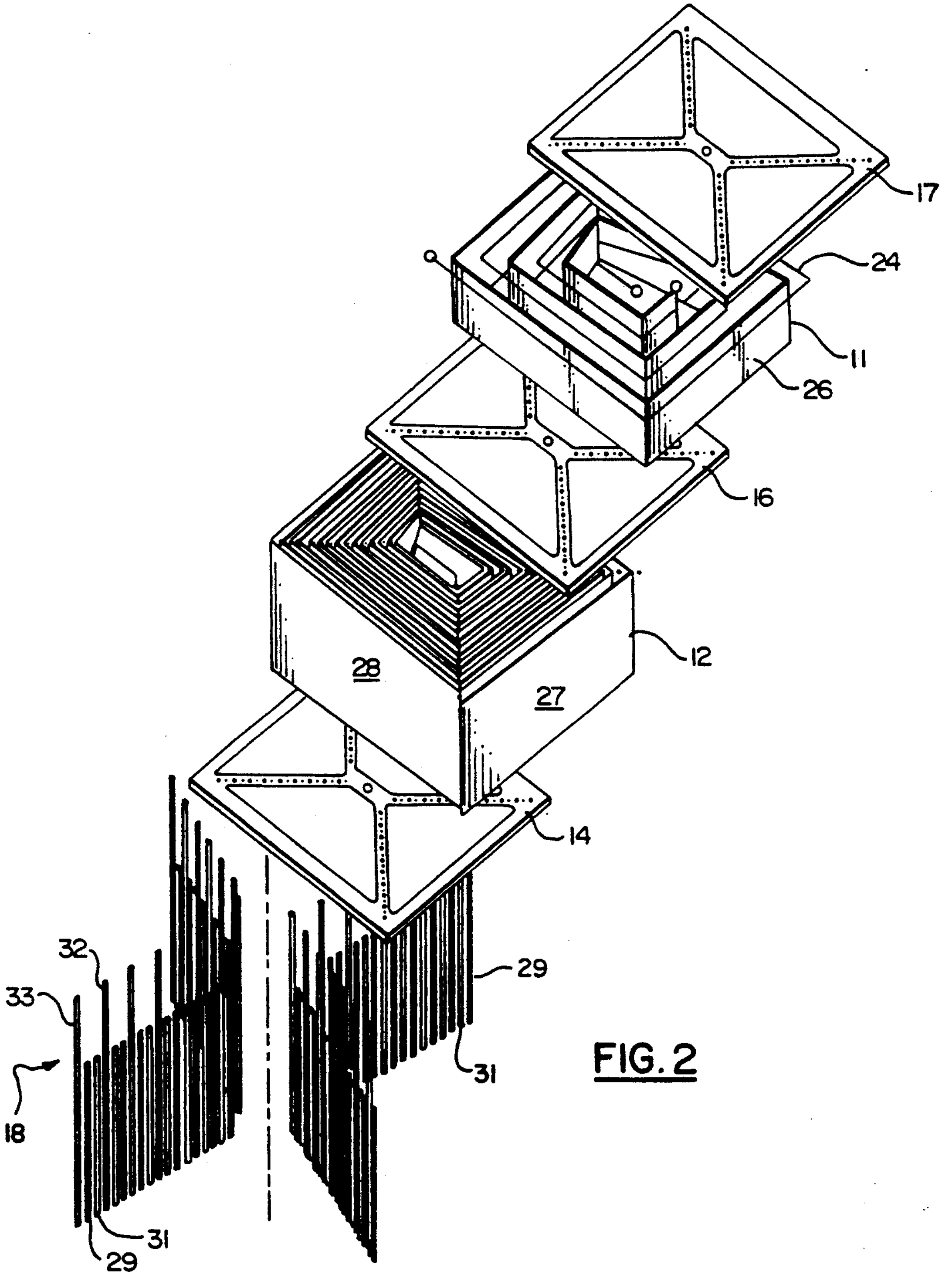
FIG. 2 is an exploded view thereof.
Figure 5:
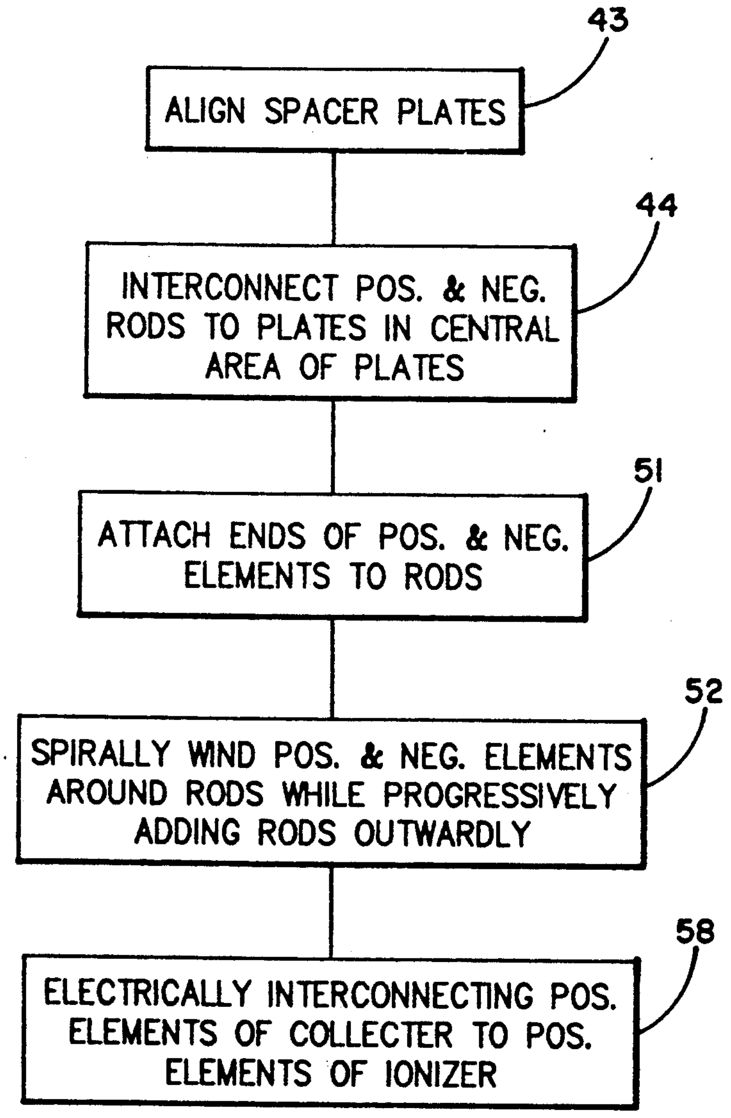
FIG. 5 is a block diagram of a method of assembly in accordance with a preferred embodiment of the invention.

Referring now to FIG. 2, the ionizer section 11, which is bounded by middle plate 16 and top plate 17, includes a positive ionizer wire 24 and a negative ionizer strip 26, with each being wound, in a spiral pattern, around a plurality of connector rods 18 so as to intermesh, one within the other, to form a completed ionizer section with fixed radial spacing between the positive ionizer wire and the negative ionizer strip through which air can flow and be ionized. Examples of suitable materials that could be used for the positive ionizer wire 24 and the negative ionizer strip 26 are 5 mil tungsen wire or 10 mil aluminum foil, respectively. A metalized film could also be used for the negative ionizer strip 26. The particular manner in which the positive ionizer wire 24 and the negative ionizer strip 26 are wound around the rods 18 will be more fully described hereinafter.

Similarly, the collector section 12, which is bounded at its one end by the bottom plate 14 and its other by the middle plate 16, is comprised of a positive collector plate 27 and a negative collector plate 28, both wound in a spiral fashion, such that they intermesh to jointly define spiral shaped passages through which the ionized air may flow, with the ionized particles then tending to collect on the negative (grounded) collector plate 28. A suitable material for use as the collector plates would be a 10 mil aluminum foil.

The connector rods 18, which function to interconnect bottom plate 14, middle plates 16, and top plate 17, and around which the positive ionizer wire 24, the negative ionizer strip 26, the positive collector plate 27 and the negative collector plate 28 are wound, include the shorter collector-only, positive 29 and collector-only, negative 31 rods as well as the longer collector/ionizer, positive 32 and the collector/ionizer, negative 33 rods. The collector-only rods 29 and 31 extend between the bottom and middle plates 14 and 16, respectively, whereas the collector/ionizer rods 32 and 33 extend between the bottom plate 14 and the top plate 17 to thereby serve as structural elements for both the collector section 12 and the ionizer section 11.

Figure 3:
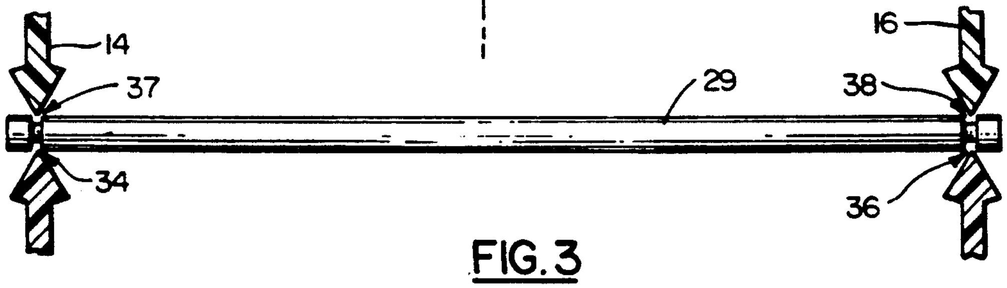
FIGS. 3 and 4 are side views of insulator rods therefor.
Figure 4:
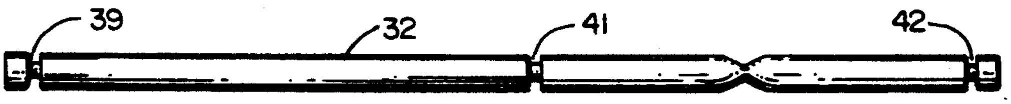

A collector-only positive rod 29, which is identical to a collector only negative rod 31 is shown in greater detail in FIG. 3. The rods 29 are made of an electrically insulative material such as, for example, an L-3 STEATITE, which is commercially available from Duco Ceramics Inc.. Indents 34 and 36 are formed near the respective ends thereof for interconnecting with the respective bottom plate 14 and middle plate 16 at the holes 37 and 38. That is, the rod 29 is pushed through the plates 14 and 16 until the edges of the plates 14 and 16, around the holes 37 and 38, snap into the indents 34 and 36, respectively.

Similarly, the collector/ionizer, positive rod 32, which is identical to the collector/ionizer, negative rod 33, has indents 39, 41 and 42 which are snapped into holes in the respective bottom plate 14, middle plate 16 and top plate 17. As an alternative structure, the rods may be made from a fiberglass, reinforced, polyester "pultrusion" material manufactured by Haysite Division of Synthane-Taylor and, rather than using indents, the rods may be glued in place.

In the above description of the ionizer and collector sections, 11 and 12, respectively, reference has been made to the positive elements (i.e. the positive ionizer wire and the positive collector plate) and to the negative elements (i.e. the ionizer strip and the negative collector plate). It should be mentioned that these terms are used in a relative sense, in that the positive elements are more positive than the negative elements. That is, the negative elements are preferably at ground, whereas the positive elements are at a high potential level, such as 8,000 volts. Thus, the term "negative" is meant to be construed in the broader sense wherever used herein. Further, it should be mentioned that the positive and negative sections could be reversed when negative ionization is employed.

Figure 6:
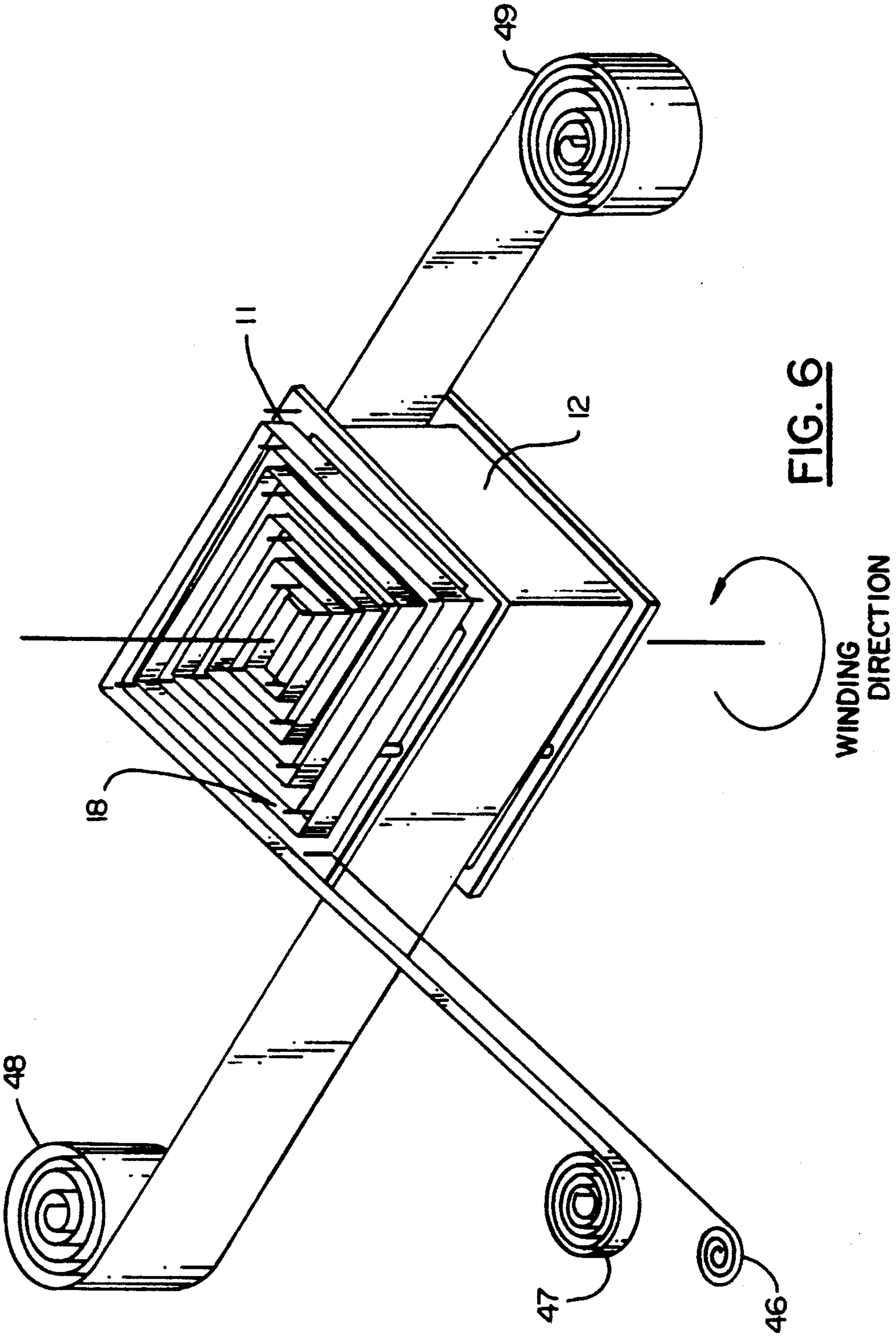
FIG. 6 is a schematic illustration of the manner in which the individual elements are wound onto the supporting rods.
Figure 7:
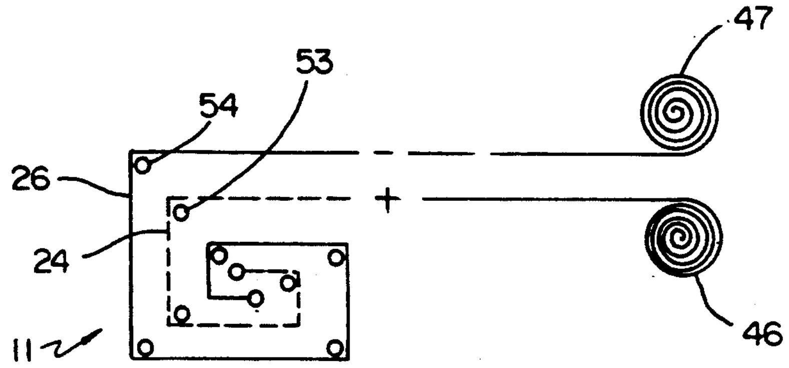
FIGS. 7 and 8 are schematic illustrations of the respective positive and negative elements after they have been wound.
Figure 8:
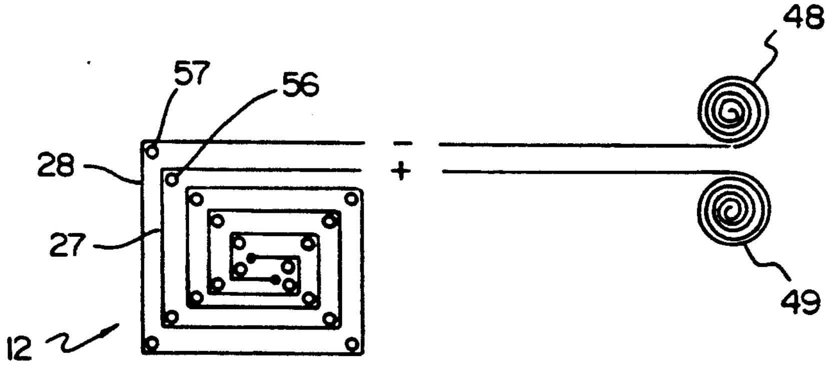

For purposes of describing the method of assembly, reference is now made to FIGS. 5–8. First, the bottom, middle and top spacer plates 14, 16 and 17 are axially aligned as shown in FIG. 2 and at block 43 of FIG. 5. The most central connecting rods 18 are then installed between the plates such that the plates are snapped into place (block 44). Next, the assembly is placed in proper alignment with various spools of material to be used for winding the various positive and negative elements on to the unit. This is shown in FIG. 6 wherein the rods corresponding to the ionizer section 11 are placed in the plane of the spool 46 of ionizer wire and the spool 47 of ionizer strip material. Similarly, the portion of the rods corresponding to the collector section is aligned in the plane of a pair of spools 48 and 49 of aluminum foil. The ends of the material from each of the spools is then attached to the appropriate rod in preparation for the subsequent winding process. This attachment may be accomplished by any of a variety of methods such as mechanical fasteners, rivets, welding, crimping, etc. That is, the ends of the material from spools 48 and 49 are connected to the rods 29 and 31 corresponding to the collector positive and collector negative plates, respectively. Similarly, the material from the wire spool 46 and the aluminum foil spool 47 are connected to the ionizer portion of the positive rod 32 and to the ionizer portion of the negative rod 33 respectively. These steps are recited in block 51 of FIG. 5. The winding process can now be initiated by rotating the assembly as indicated in FIG. 6, with connecting rods 18 being progressively added in a outwardly spiraling pattern, such that the proper spacing is maintained between the opposite polarity elements. Further, during this winding process the proper tension is maintained in the material being wound such that it is relatively taut, and therefore the subsequent occurrence of "oil canning" can be avoided. This step is shown in block 52, FIG. 5. At the the end of the winding process, the ionizer section 11 and the collector section 12 will appear as shown in FIGS. 7 and 8, respectively. It is then necessary to connect each of the positive and negative elements to their most radially outer rod. That is, in the ionizer section 11, the positive ionizer wire 24 is secured to the rod 53, and the negative ionizer strip 26 is secured to the rod 54. The material from the spools 46 and 47 is then severed and the spools are prepared for the next unit. In a similar manner, the end of the positive collector plate 27 is secured to the radially outer rod 56 of the collective section, and the outer end of the negative collector plate 28 is secured to radially outer rod 57 of the collector section 12. The material from the spools 48 and 49 is then severed to remove the completed cell.

With such an integral structure, wherein the collector and ionizer are assembled simultaneously and as a single unit, it is desirable that the negative ionizer wire 24 of the ionizer section be at the same potential as the negative collector plate 27 of the collector. The same may be true for the respective positive sections. Further, it is desirable that this be accomplished with a simple electrical connection. This can be easily accomplished with the present invention by a single connector rod which, instead of being made of insulative material, is made of a conductive material such as copper or aluminum. For this purpose, such a conductive rod may be placed at any position within the unit wherein it makes electrical contact with both the negative (or positive) ionizer wire 24 and the negative (or positive) collector plate 27. The high voltage power can then be connected to either the ionizer 11 or the collector 12 and it will be automatically connected to the other. This step is shown in block 58 of FIG. 5.

While the combination ionizer/collector has been shown and described as having three plates, it should be mentioned that the top plate could be eliminated such that the relatively short ionizer rods are simply cantilevered out from the second plate.

It will be seen in FIGS. 7 and 8 that, whereas the pattern of the positive and the negative elements are somewhat rectangular in form, they are also formed in a spiral pattern in that they start as small rectangles and become progressively larger toward the outer side. It should be recognized that this pattern may be varied substantially while remaining within the general scope contemplated by this invention.

While the invention has been described with some specificity as shown in the preferred embodiment, it will be recognized by those skilled in the art that various modifications and alternate constructions can be made thereto while remaining within scope and spirit of the present invention.

What is claimed is:

1. In an improved electrostatic air cleaner having an ionizer section which includes a plurality of alternately arranged, positively and negatively charged, elements for ionizing particles contained in the air flowing therethrough, and having axially spaced from the ionizer section, a collector section which includes a plurality of alternately arranged, positively and negatively charged elements for attracting or repelling the ionized particles, wherein the improvement comprises:

each of said collector negatively charged elements and said collector positively charged elements being continually wound in an outwardly expanding spiral fashion around a central axis aligned in the direction of air flow, and being supported by a plurality of non-electrically conductive rods extending in the direction of air flow wherein said plurality of non-conductive rods extend axially into the ionizer section, and further wherein said negative and positive charged ionizer elements are supported by said rods.

2. In an improved electrostatic air cleaner having an ionizer section which includes a plurality of alternately arranged, positively and negatively charged, elements for ionizing particles contained in the air flowing therethrough, and having axially spaced from the ionizer section, a collector section which includes a plurality of alternately arranged, positively and negatively charged elements for attracting or repelling the ionized particles, wherein the improvement comprises:

each of said collector negatively charged elements and said collector positively charged elements being continually wound in an outwardly expanding spiral fashion around a central axis aligned in the direction of air flow, and being supported by a plurality of non-electrically conductive rods extending in the direction of air flow and further including at least one electrically conductive rod extending between the respective negatively charged elements of the ionizer and the negatively charged elements of the collector.

3. An improved electrostatic air cleaner as set forth in claim 2 and further including at least one electrically conductive rod extending between the respective positively charged elements of the ionizer and the positively charged elements of the collector.

4. A method of assembling an electronic air cleaner having adjacent ionizer and collector sections arranged in serial flow relationship along a central axis, comprising the steps of:

providing first and second axially spaced support plates, said plates having a peripheral framework surrounding a generally open inner area and having a rib structure extending generally radially inwardly with spaced holes formed therein;

placing a pair of non-conductive rods between the support plates and inserting each into a radially inner hole of the rib structure in each of said plates;

connecting one end of a negative charge conductor element to one of said rods;

connecting one end of a positive charge conductor element to the other of said rods; and continuing to add non-conductive rods between said plates, progressively inserting them into the holes towards the peripheral framework, while simultaneously winding said negative and positive charged elements around said insulator rods in a spiral fashion, such that a spiral wound negative charge conductor element intermeshes with a radially spaced, spiral wound, positive charge conductor element, and is electrically insulated therefrom, to jointly form a section of an electronic air cleaner, wherein a number of said non-conductive rods are long enough that they extend beyond said second plate to comprise an ionizer section, and including the steps of;

connecting one end of a negative ionizer element to one of said extended rods;

connecting one end of a positive ionizer element to another of said extended rods; and as the extended rods are progressively added to extend beyond the second plate, simultaneously winding said negative and positive ionizer elements around said extended rods in a spiral fashion, such that a spiral wound negative ionizer element intermeshes with the radially spaced, spiral wound positive ionizer element and is electrically insulated therefrom, to jointly form an ionizer section.

5. The method as set forth in claim 4 and including the steps of providing a third support plate with similar peripheral framework and rib structure with holes therein, said plate being actually spaced from said second plate to form one end of the ionizer section; and, as the extended rods are added to extend beyond the second plate, inserting said extended rods into said third plate rib structure holes.

6. A method as set forth in claim 4 including the additional step of inserting an electrically conductive rod between the negative ionizer element of the ionizer section and the negative charge conductor element of the collector section such that they are caused to remain at the same electrical potential.

7. A method as set forth in claim 4 including the additional step of inserting an electrically conductive rod between the positive ionizer element of the ionizer section and the positive charge conductor element of the collector section such that they are caused to remain at the same electrical potential.

* * * * *